B. FORD.
SECONDARY OR STORAGE BATTERY.
APPLICATION FILED APR. 4, 1918.

1,285,660.

Patented Nov. 26, 1918.

WITNESS:
Robt R Kitchel.

INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

SECONDARY OR STORAGE BATTERY.

1,285,660.  Specification of Letters Patent.  Patented Nov. 26, 1918.

Application filed April 4, 1918. Serial No. 226,737.

*To all whom it may concern:*

Be it known that I, BRUCE FORD, a citizen of the United States, and a resident of Philadelphia, in the county of Philadelphia and State of Pennsylvania, have invented certain new and useful Improvements in Secondary or Storage Batteries, of which the following is a specification.

The principal object of the present invention is to minimize leakage between the cells of a multiple voltage battery and at the same time to provide sufficient mechanical strength.

Other objects of the invention will appear from the following description of the embodiments of the invention chosen for illustration in the accompanying drawings, in which—

Figure 1:
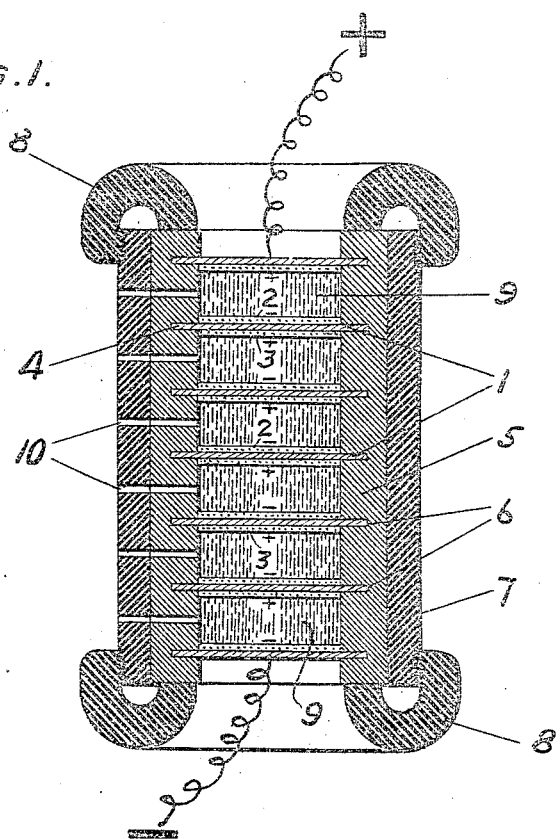
Figure 2:
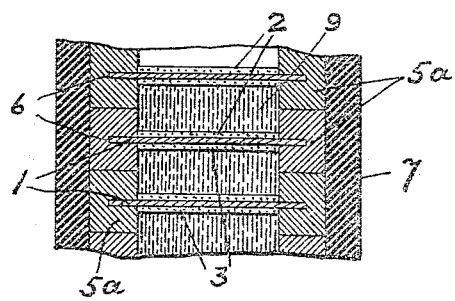

Figure 1, is a view principally in central section of a multiple voltage battery embodying features of the invention, and Fig. 2, is a sectional view, illustrating a modification.

The conducting supports 1, are provided on one of their faces with negative pole plate active material 2 and on the other of their faces with positive pole plate active material 3, and the supports extend beyond the active material as at 4. This structure may be otherwise described as a plate having at the central portion of one face a negative formation and at the central portion of the other face a positive formation and having its rim projecting beyond both formations. 5, is a tube of soft rubber or other suitable yielding material and it is internally provided with grooves 6, which receive the parts of the plate 1 which project beyond the formations on the faces thereof. This tube may be continuous and consist of one piece, as shown in Fig. 1, or it may be built up of continuous ring-sections 5ᵃ, each provided with a groove 6, as shown in Fig. 2. The point is that in each case the wall of the groove is continuous, or in other words, the groove is formed in an intermediate portion of a solid ring element, the ring element in Fig. 1 being integral and constituting a one piece tube, whereas in Fig. 2, the ring elements are assembled to constitute the tube. In each case the tube 5, is preferably arranged within a compressing device as a hard rubber or like tube 7. 8, are caps or end pieces, either or both of which have screw-thread engagement with the hard rubber tube 7 and abut upon the ends of the soft rubber tube, and by providing longitudinal pressure insure tightness of all joints. The electrolyte 9 may be liquid plain, or held soaked in blotting paper or the like, or in gelatinous, or other forms. 10, are vents and when the electrolyte is in liquid form, the battery may be laid upon its side with the vents at the top. The fact that the walls of the grooves 6 are continuous or integral with each other is important for many reasons, one of which is that it prevents leakage, liquid and electrical, between the cells. The end pieces or clamping rings 8 by compressing this rubber tube 1 in the hard rubber tube 7, cause the walls of the grooves 6 to closely hug the rims of the plate structures and thus insures tight joints.

One way of assembling the structure, shown in Fig. 1, is to start with the soft rubber tube turned inside out with the grooves on the outside and to right it in the act of assemblage. Another way is to build up the soft rubber tube around the plate structure before it is vulcanized.

What I claim is:

1. A multiple voltage battery comprising the combination of a one piece inner tube of relatively yielding material internally provided with annular grooves, plate structures having their rims engaged by the walls of said grooves, an external tube of relatively non-yielding material, and end pieces connected with the external tube and pressing on the ends of the inner tube, substantially as described.

2. A multiple voltage battery comprising the combination of a one piece inner tube of yielding material internally provided with annular grooves, plate structures having their rims engaged by the walls of said grooves, an external casing, and means for compressing the inner tube endwise.

3. A multiple voltage battery comprising the combination of a one piece tube internally provided with annular grooves and plate structures having their rims engaged by the walls of said grooves.

4. In a multiple voltage battery the combination of an inner continuous ring element of relatively yielding material having an internal annular groove of which the wall is continuous, a plate structure having its rim inclosed by the continuous wall of the groove, and means for compressing the ring element, substantially as described.

BRUCE FORD.